United States Patent
Major et al.

(10) Patent No.: US 8,029,343 B2
(45) Date of Patent: Oct. 4, 2011

(54) VEHICLE BODY PRESSURE RELIEF SYSTEM

(75) Inventors: Gregory A. Major, Farmington Hills, MI (US); Christopher C. Nyeholt, Armada, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1036 days.

(21) Appl. No.: 11/865,757

(22) Filed: Oct. 2, 2007

(65) Prior Publication Data

US 2009/0088062 A1    Apr. 2, 2009

(51) Int. Cl.
*B60H 1/00*    (2006.01)
*B60H 1/32*    (2006.01)

(52) U.S. Cl. .......................................... 454/70; 62/244
(58) Field of Classification Search ............... 454/70; 62/244

See application file for complete search history.

(56) References Cited

U.S. PATENT DOCUMENTS

| 5,937,664 | A  | * | 8/1999 | Matsuno et al. | 62/259.2 |
| 6,497,275 | B1 | * | 12/2002 | Elliot | 165/204 |
| 2005/0138941 | A1 | | 6/2005 | Kikuchi | |
| 2005/0199845 | A1 | | 9/2005 | Jones et al. | |

FOREIGN PATENT DOCUMENTS

JP    2005324771 A    11/2005

* cited by examiner

*Primary Examiner* — Steve McAllister
*Assistant Examiner* — Helena Kosanovic

(57) ABSTRACT

A battery pack cooling and body pressure relief system for a vehicle having a passenger cabin is disclosed. The system may include an intake air flow duct connected between the passenger cabin and the battery pack, and an air flow duct connected between the exhaust air outlet and the body pressure relief valve. The system may include a one-way cabin pressure relief vent connected to the air flow duct and configured to selectively allow for air flow into the air flow duct, and may include a duct pressure relief vent connected to the air flow duct and configured to selectively allow for air flow out of the air flow duct into the vehicle.

16 Claims, 2 Drawing Sheets

VEHICLE BODY PRESSURE RELIEF SYSTEM

BACKGROUND OF INVENTION

The present invention relates generally to body pressure relief systems for automotive vehicles, and more particularly for automotive vehicles having a battery pack.

Some modern automotive vehicles are propelled by electric motors, whether a fuel cell, hybrid electric vehicle or a pure electric vehicle. These vehicles include battery packs for storing electric charge used to drive the motor. A significant amount of energy flow into and out of the battery pack can occur, which may raise the temperature of the battery pack above levels that are desirable. Consequently, some of these vehicles use various techniques for cooling the battery pack. Given the additional cost and complexity of cooling a battery pack, it is thus desirable to cool it in the most efficient and least costly way possible.

Also, since some vehicles are sold in a conventional drivetrain arrangement (without a battery pack) in addition to hybrid electric vehicle models, it is desirable to minimize changes to the bodies of the vehicles between the two types while still providing for the proper functioning of both vehicle types.

SUMMARY OF INVENTION

An embodiment contemplates a battery pack cooling and body pressure relief system for a vehicle having a passenger cabin. The system may include an intake air flow duct having a battery module air inlet in fluid communication with the passenger cabin; a battery pack connected to and in fluid communication with the intake air flow duct, and including an exhaust air outlet; a one-way body pressure relief vent configured to selectively allow for air flow to atmosphere outside the vehicle; an air flow duct connected between the exhaust air outlet and the body pressure relief valve; and a one-way cabin pressure relief vent connected to the air flow duct and configured to selectively allow for air flow into the air flow duct.

An embodiment contemplates a battery pack cooling and body pressure relief system for a vehicle having a passenger cabin. The system may include an intake air flow duct having a battery module air inlet in fluid communication with the passenger cabin; a battery pack connected to and in fluid communication with the intake air flow duct, and including an exhaust air outlet; a one-way body pressure relief vent configured to selectively allow for air flow to atmosphere outside the vehicle; an air flow duct connected between the exhaust air outlet and the body pressure relief valve; and a duct pressure relief vent operatively engaging the air flow duct to selectively allow for air flow from the air flow duct into the vehicle.

An embodiment contemplates a method for controlling air flowing into and out of a passenger cabin of a vehicle and the air flowing through a battery pack of a battery module, the method comprising the steps of: controlling a speed of a battery pack blower in coordination with air flow through a HVAC module; selectively allowing for one-way flow of air from within the vehicle through a cabin pressure relief vent into an air flow duct connected between the battery pack and a one-way body pressure relief vent; selectively allowing for one-way flow of air from within the air flow duct to atmosphere outside the vehicle through the body pressure relief vent; and drawing air from within the passenger cabin to the battery pack through an intake air flow duct.

An advantage of an embodiment is that both battery cooling/heating and cabin pressure relief can be accomplished without the need for an additional body pressure relief vent. Thus, for both a conventional powertrain version of the vehicle and for a hybrid, fuel cell or electric version of the vehicle, only one body pressure relief vent is needed. No body modification needed to add an extra body pressure relief vent for the cabin—avoid tooling costs that would be otherwise be incurred to modify body panels to include a second body pressure relief vent in hybrid or electric versions of the vehicle.

An advantage of an embodiment is that warmed air exiting the battery pack can be recirculated to the cabin to reduce the load on the HVAC module for cabin heating.

An advantage of an embodiment is that the air flowing from the battery pack through an air flow duct to the body pressure relief vent reduces the chances for dust and gas intrusion into battery pack.

An advantage of an embodiment is that no additional filtration or water separation is needed for the battery thermal air path since the existing HVAC module takes care of this when cooling the air before it enters the passenger cabin.

DETAILED DESCRIPTION

Figure 1:
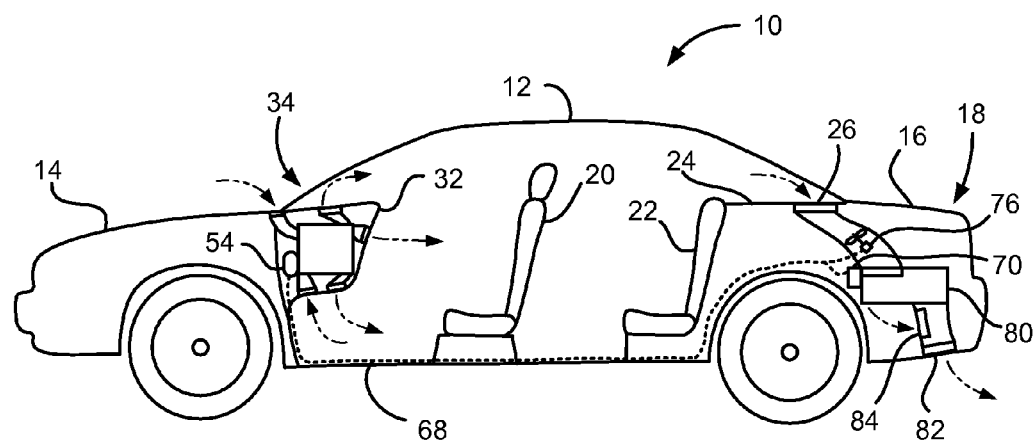
FIG. 1 is a schematic side elevation view of an automotive vehicle, according to a first embodiment.
Figure 2:
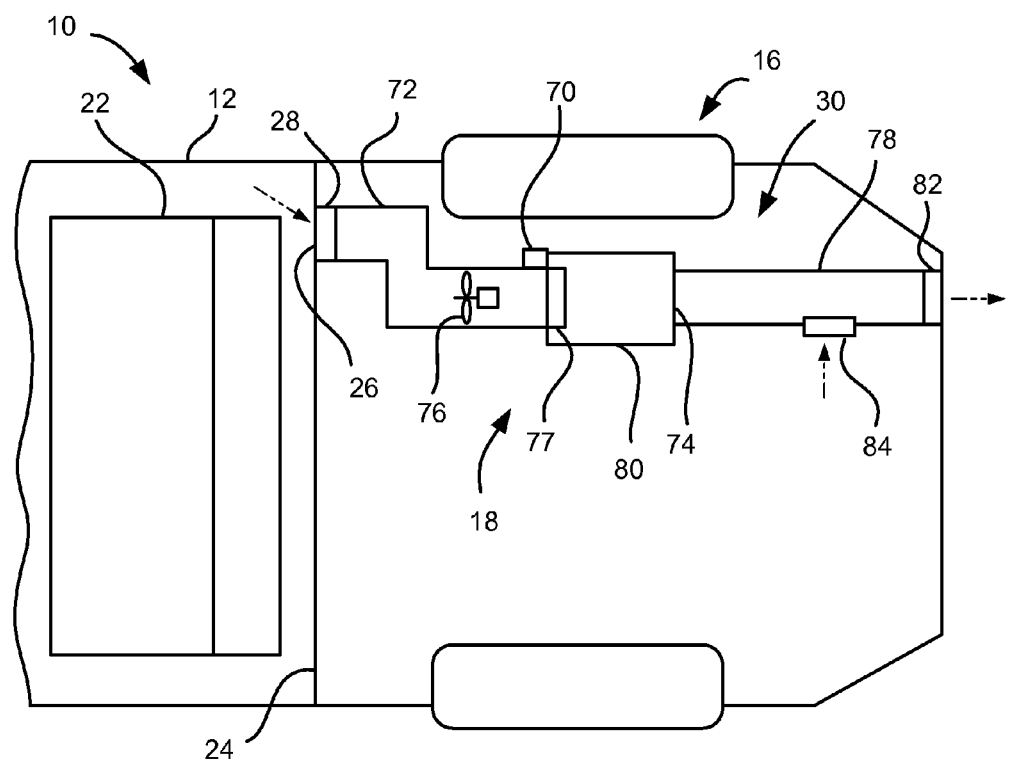
FIG. 2 is schematic plan view of a portion of an automotive vehicle, according to the first embodiment.

FIGS. 1-2 illustrate a vehicle 10 according to a first embodiment. The vehicle 10 includes a passenger cabin 12, a front portion 14, which may contain an engine, motor, or fuel cell (not shown), and a rear portion 16, which may be a trunk (for a sedan) or rear cargo area (if a sport utility, station wagon, or similar type of vehicle) and contains a battery module 18. The basic vehicle architecture may be a hybrid electric, electric, or other similar type of vehicle propulsion architecture where a battery module 18 is employed. The battery module 18 may be packaged in the trunk of a sedan, or behind the trim or under the load floor in the rear compartment of a station wagon or sport utility vehicle.

The passenger cabin 12 may include front seats 20 and rear seats 22. A package shelf 24 (or trimmed load floor, if not a sedan) is located behind the rear seats 22 and includes a battery module air inlet 26, which may be designed to allow flow in only one direction-out of the passenger cabin 12. The air inlet 26 may include an inlet debris screen 28.

An instrument panel 32 may be located in the passenger cabin 12 and include a heating, ventilation and air conditioning (HVAC) module 34 mounted behind or underneath it. The HVAC module 34 may also include a HVAC module controller 54. The HVAC module controller 54 may also communicate with a battery pack controller 70 via a communication line 68. The communication line in FIG. 1 is indicated by a dashed line and may carry signals via copper, fiber optic, radio wave transmission, or any other suitable means for transmitting the signals. The battery pack controller 70 may be part of the battery module 18, or alternatively may be integrated with the HVAC module controller 54 or some other vehicle controller (not shown). The battery module 18 may also include a temperature sensor (not shown) that communicates with the HVAC controller 54 to provide input relating to the temperature in the battery pack 80. A battery pack blower 76 and heater 77 may be controlled by the HVAC controller 54 or alternatively the battery pack controller 70. The battery pack blower 76 may be located in the battery pack 80 or separated from the battery pack 80, but located within and connected by an intake air flow duct 72, which is part of a vehicle body pressure relief system 30.

The body pressure relief system 30 includes not only the intake air flow duct 72, which connects between the battery air inlet 26 and a battery pack 80, but also includes an air flow duct 78 extending from an exhaust air outlet 74 of the battery pack 80 directly to a body pressure relief vent 82. A cabin pressure relief vent 84 is added to the side of the air flow duct 78. The cabin pressure relief vent 84 is a one-way valve that provides an air path for air to exit the vehicle due to door closures or the HVAC module 34 being in outside air mode (bringing in fresh air from outside the vehicle).

The vehicle 10 having the HVAC module 34, battery module 18, and vehicle body pressure relief system 30 discussed above can be operated in various modes to provide multiple different functions relating to cooling or heating the passenger cabin 12 and cooling the battery pack 80. The possible directions for air flow in the various modes of operation are indicated by the phantom-line arrows shown in FIGS. 1 and 2.

In one operating mode, air is drawn into the vehicle 10 by the HVAC module 34, is cooled and then directed into the passenger cabin 12. The battery pack blower 76 draws the cooled air from the passenger cabin 12, through the battery module air inlet 26 and the intake air flow duct 72. The air then flows through the battery pack 80 to cool the batteries, and out through the exhaust air inlet 74 into the air flow duct 78. As the pressure in the air flow duct 78 increases a certain amount above atmospheric pressure, the one-way body pressure relief vent 82 opens, allowing the air to flow out of the vehicle 10 to atmosphere. The cabin pressure relief vent 84 is a one-way valve, so the air will not flow from the air flow duct 78 into the rear portion 16 of the vehicle. Coordination of blower speeds by the HVAC module controller 54 and battery pack controller 70 assure that negative cabin air pressure is avoided. This can be accomplished, for example, by adjusting the HVAC module blower speed, adjusting the amount of recirculated air versus fresh air drawn into the HVAC module 34 or a combination of both.

In another operating mode, the air flow path is the same, but the HVAC module 34, the battery pack heater 77, or both warm the air before it passes through the battery pack 80.

Also, for a vehicle door close mode, the excess cabin air pressure will flow through the cabin pressure relief vent 84 and out through the body pressure relief vent 82. With this embodiment, then, both battery cooling/heating and cabin pressure relief can be accomplished without the need for an additional body pressure relief vent. Thus, for both a conventional powertrain version of the vehicle 10 and a hybrid or electric version of the vehicle, only one body pressure relief vent is needed.

Figure 3:
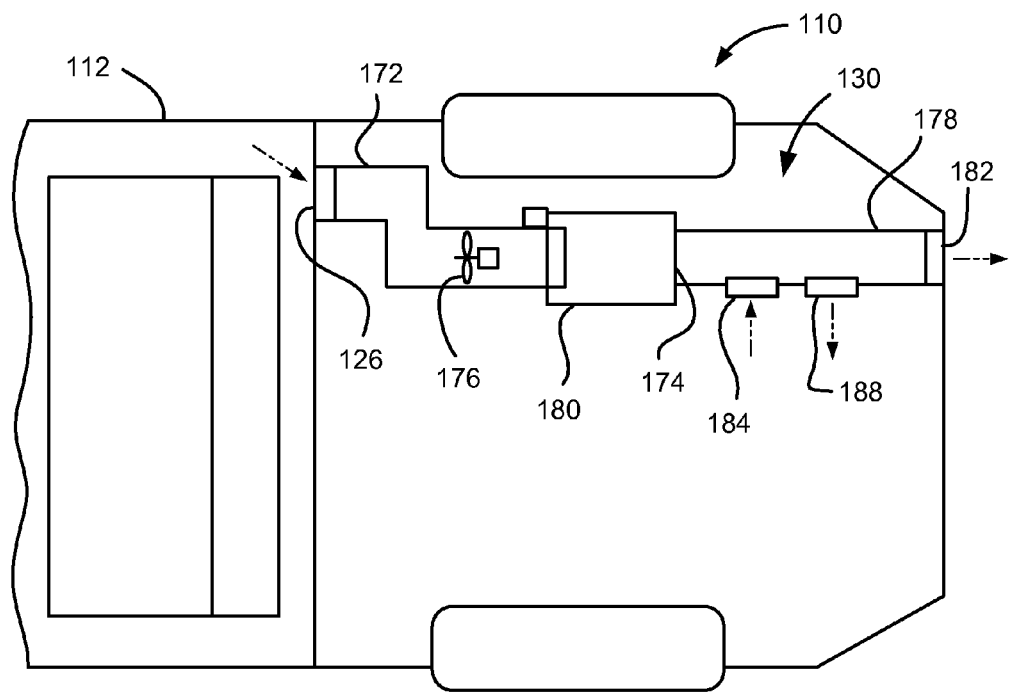
FIG. 3 is a schematic plan view similar to FIG. 2, but illustrating a second embodiment.

FIG. 3 illustrates a second embodiment. Since this embodiment is similar to the first, similar element numbers will be used for similar elements, but employing 100-series numbers. The air flow path for the vehicle body pressure relief system 130 still includes the battery module air inlet 126 between the passenger cabin 112 and the intake air flow duct 172, and the air flow duct 178 extending between the exhaust air outlet 174 of the battery pack 180 and the body pressure relief vent 182. However, in addition to the cabin pressure relief vent 184, there is also a passive duct pressure relief vent 188 mounted to the air flow duct 178.

The cabin pressure relief vent 184 still provides an air path for air to exit the vehicle 110 through the body pressure relief vent 182 due to door closures or the HVAC module (shown in FIG. 1) drawing air in from outside of the vehicle 110. The passive duct pressure relief vent 188 is a one-way valve facing the opposite direction as the cabin pressure relief vent 184, so it allows for air exiting the battery pack 180 to enter the cabin 112 when the pressure difference is above a predetermined amount. Having the passive duct pressure relief vent reduces or eliminates the need to coordinate the speed of the battery pack blower 176 and blower speed in the HVAC module. Moreover, when warming the batteries, warmed air exiting the battery pack 180 can be recirculated to the passenger cabin 112 in order to reduce the load on the HVAC module for cabin heating. The percentage of air flow returned to the passenger cabin 112 can be controlled by the relative pressure differences at which each of the relief vents 182, 188 opens. The lower the threshold for the passive duct pressure relief vent 188 relative to the body pressure relief vent 182, the more air flow that is returned to the passenger cabin 112.

Figure 4:
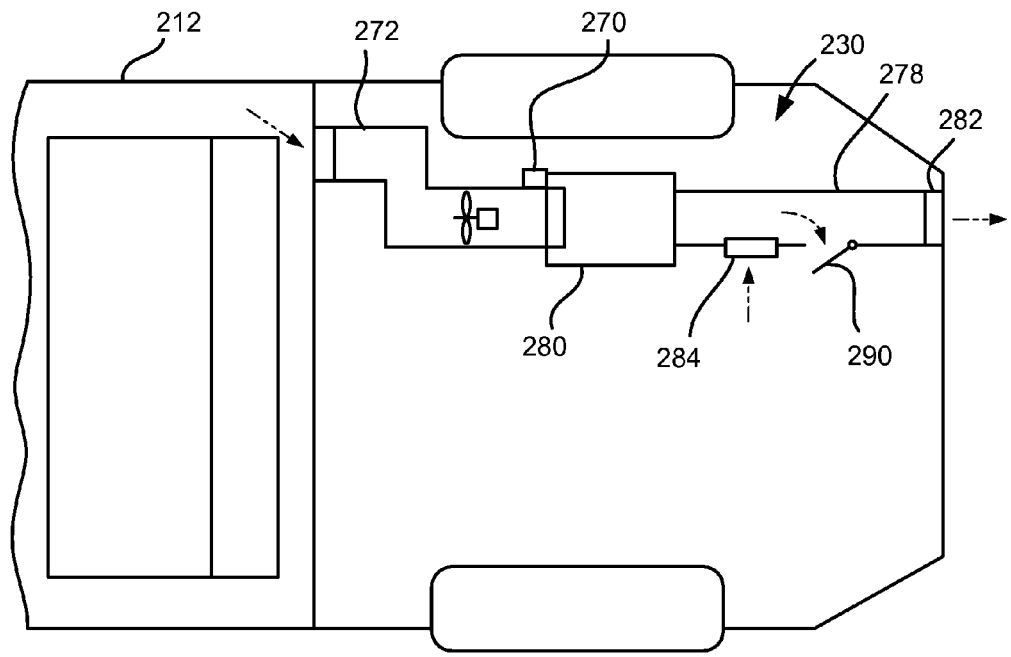
FIG. 4 is a schematic plan view similar to FIG. 2, but illustrating a third embodiment.

FIG. 4 illustrates a third embodiment. Since this embodiment is similar to the second, similar element numbers will be used for similar elements, but employing 200-series numbers. The vehicle body pressure relief system 230 is similar to the second embodiment, but with the replacement of the passive duct pressure relief vent with an active duct pressure relief vent 290. The cabin pressure relief vent 284 may remain a passive vent. The active duct pressure relief vent 290 may be controlled by the HVAC module controller (shown in FIG. 1) or the battery pack controller 270. In this way, air drawn in through the intake air flow duct 272 and battery pack 280 can be selectively directed to flow out through the body pressure relief vent 282 or through the active duct pressure relief vent 290. This allows for more control over when the air is redirected from the air flow duct 278 back into the passenger cabin 212.

While certain embodiments of the present invention have been described in detail, those familiar with the art to which this invention relates will recognize various alternative designs and embodiments for practicing the invention as defined by the following claims.

What is claimed is:

1. A battery pack cooling and body pressure relief system for a vehicle having a passenger cabin comprising:
   an intake air flow duct having a battery module air inlet in fluid communication with the passenger cabin;
   a battery pack connected to and in fluid communication with the intake air flow duct, and including an exhaust air outlet;
   a one-way body pressure relief vent having a one way body pressure relief valve configured to selectively allow for air flow to atmosphere outside the vehicle;
   an air flow duct connected and providing an unobstructed path between the exhaust air outlet and the body pressure relief valve; and
   a one-way cabin pressure relief vent having a one-way valve connected to the air flow duct and configured to selectively allow for air flow into the air flow duct.

2. The battery pack cooling and body pressure relief system of claim 1 including a one-way passive duct pressure relief vent connected to the air flow duct and configured to selectively allow for air flow out of the air flow duct into the vehicle.

3. The battery pack cooling and body pressure relief system of claim 1 including an active duct pressure relief vent connected to the air flow duct and a controller operatively engaging the active pressure relief vent to selectively allow for air flow from the air flow duct into the vehicle.

4. The battery pack cooling and body pressure relief system of claim 1 including a battery pack blower configured to selectively draw air through the intake air flow duct.

5. The battery pack cooling and body pressure relief system of claim 4 including a controller configured to control the battery pack blower in coordination with a HVAC module.

6. The battery pack cooling and body pressure relief system of claim 1 including a battery pack heater configured to selectively warm air flowing through the battery pack.

7. The battery pack cooling and body pressure relief system of claim 1 including an inlet screen mounted at the battery module air inlet of the intake air flow duct.

8. A battery pack cooling and body pressure relief system for a vehicle having a passenger cabin comprising:
- an intake air flow duct having a battery module air inlet in fluid communication with the passenger cabin;
- a battery pack connected to and in fluid communication with the intake air flow duct, and including an exhaust air outlet;
- a one-way body pressure relief vent comprising configured to selectively allow for air flow to atmosphere outside the vehicle;
- an air flow duct connected between the exhaust air outlet and the body pressure relief vent; and
- a one way body pressure relief valve comprising a one-way valve connected to the air flow duct and configured to selectively allow for air flow into the airflow duct;
- a duct pressure relief vent operatively engaging the air flow duct to selectively allow for air flow from the air flow duct into the vehicle.

9. The battery pack cooling and body pressure relief system of claim 8 wherein the duct pressure relief vent is a one-way passive duct pressure relief vent.

10. The battery pack cooling and body pressure relief system of claim 8 wherein the duct pressure relief vent is an active duct pressure relief vent connected to the air flow duct, and wherein a controller operatively engages the active pressure relief vent to selectively allow for air flow from the air flow duct into the vehicle.

11. The battery pack cooling and body pressure relief system of claim 8 including a battery pack blower configured to selectively draw air through the intake air flow duct.

12. A method for controlling air flowing into and out of a passenger cabin of a vehicle and the air flowing through a battery pack of a battery module, the method comprising the steps of:
- controlling a speed of a battery pack blower in coordination with air flow through a HVAC module;
- selectively allowing for one-way flow of air from within the vehicle through a cabin pressure relief vent comprising a one-way valve into an air flow duct connected between the battery pack and a one-way body pressure relief vent comprising a one-way pressure relief valve;
- selectively allowing for one-way flow of air from within the air flow duct to atmosphere outside the vehicle through the body pressure relief vent; and
- drawing air from within the passenger cabin to the battery pack through an intake air flow duct.

13. The method of claim 12 including a step of selectively allowing for one-way flow of air from within the air flow duct into the vehicle through a passive duct pressure relief vent.

14. The method of claim 12 including controlling an active duct pressure relief vent to selectively allow for flow of air from within the air flow duct into the vehicle through the active duct pressure relief vent.

15. The method of claim 12 wherein the step of drawing air is further defined by screening air flowing from the passenger cabin into the intake air flow duct.

16. The method of claim 12 including warming the air flowing from the intake air flow duct into the battery pack with a battery pack heater.

* * * * *